United States Patent
Borra et al.

(10) Patent No.: US 11,270,210 B2
(45) Date of Patent: *Mar. 8, 2022

(54) OUTLIER DISCOVERY SYSTEM SELECTION

(71) Applicant: salesforce.com, inc., San Francisco, CA (US)

(72) Inventors: Ajay Krishna Borra, Telangana (IN); Manpreet Singh, Hyderabad (IN)

(73) Assignee: salesforce.com, inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/840,783

(22) Filed: Apr. 6, 2020

(65) Prior Publication Data

US 2020/0334540 A1    Oct. 22, 2020

Related U.S. Application Data

(63) Continuation of application No. 15/608,375, filed on May 30, 2017, now Pat. No. 10,614,362.

(51) Int. Cl.
| | | |
|---|---|---|
| *G06N 3/08* | (2006.01) | |
| *G06F 11/30* | (2006.01) | |
| *G06N 3/04* | (2006.01) | |
| *G06K 9/62* | (2022.01) | |
| *G06N 20/10* | (2019.01) | |

(52) U.S. Cl.
CPC ......... *G06N 3/084* (2013.01); *G06F 11/3003* (2013.01); *G06K 9/6274* (2013.01); *G06K 9/6284* (2013.01); *G06N 3/0445* (2013.01); *G06F 2201/835* (2013.01); *G06F 2201/86* (2013.01); *G06N 20/10* (2019.01)

(58) Field of Classification Search
CPC .... G01B 21/045; G01B 21/042; G01B 21/20; G06N 3/084; G06N 3/0045; G06F 11/3003; G06K 9/6274; G06K 9/6284
USPC ........................................................ 702/179
See application file for complete search history.

(56) References Cited

U.S. PATENT DOCUMENTS

| | | | |
|---|---|---|---|
| 8,306,931 B1 | 11/2012 | Bowman | |
| 10,223,403 B2* | 3/2019 | Malhotra | ................ G06F 17/18 |
| 2010/0045465 A1* | 2/2010 | Brauker | ............. A61B 5/14532 |
| | | | 340/573.1 |
| 2016/0242690 A1* | 8/2016 | Principe | ................... A61B 5/16 |

* cited by examiner

*Primary Examiner* — Aditya S Bhat
(74) *Attorney, Agent, or Firm* — Butzel Long

(57) ABSTRACT

Systems, device and techniques are disclosed for outlier discovery system selection. A set of time series data including time series data objects may be received. A sample of time series data objects may be extracted from the time series data. The sample of time series data objects may be decomposed into sub-components. Statistical classification may be used to select an outlier discovery system based on the sub-components. A neural network may be used to select an outlier discovery system based on the sub-components. A level of error of the neural network may be determined based on a comparison of the outlier discovery system selection made using statistical classification and the outlier discovery system selection made by the neural network. Weight of the neural network may be updated based on the level of error of the neural network.

20 Claims, 10 Drawing Sheets

OUTLIER DISCOVERY SYSTEM SELECTION

BACKGROUND

Different systems can be used to detect outlying data in a set of time series data. The system used on a given set of time series data may need to be selected based on the characteristics of that set of time series data. Outlying data will appear differently in different types of time series data, depending on what kind of patterns would normally be expected in the time series data. Outlying data may appear differently in time series data that includes hard drive temperatures than it will in time series data that includes winter clothing sales. Detecting outlying data in a set of time series data may be useful for detecting problems in computer hardware and software. Outlying data in a time series of hard drive temperatures may show drives running too hot or indicate drive failures. Outlying data may also indicate anomalies in other types of data, such as sales data.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
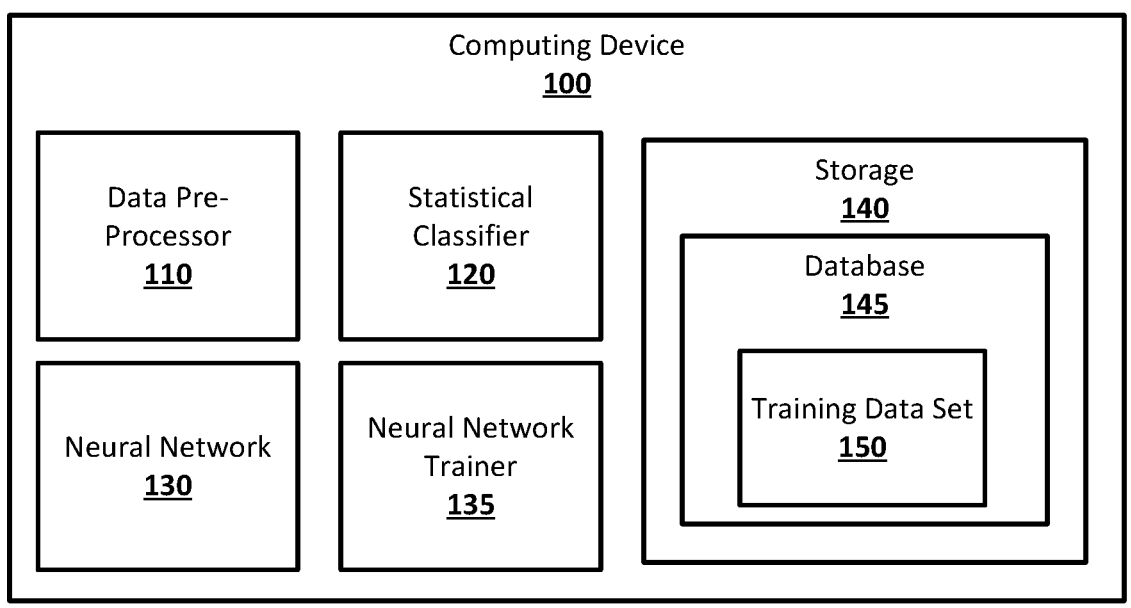
FIG. 1 shows an example system for outlier discovery system selection according to an implementation of the disclosed subject matter.

Techniques disclosed herein enable outlier discovery system selection, which may allow for the selection of an outlier discovery system to be used to detect outlying data in a set of time series data. A neural network may be trained to select an appropriate outlier discovery system to be used with a specific set of time series data. A statistical classifier may be designed with classification rules that may be used to select an outlier discovery system to use based on input that represents a set of time series data. A training data set may be created by inputting representations of various sets of time series data into the statistical classifier, which may then output a selection of an outlier discovery system for each set of time series data. The outlier discovery systems selected by the statistical classifier may be adjusted based on human review. The training data set may be used to train a neural network to select an outlier discovery system for sets of time series data. After the neural network has been trained, input representing sets of time series data that are not part of the training data set may be input to the neural network, which may select outlier discovery systems for the sets of time series data. The selected outlier discovery systems may be applied to the sets of time series data to determine the presence of any outlying data. Appropriate action may be taken when outlying data is detected in a set of time series data. Using a neural network to select an appropriate outlier discovery system for a set of time series data may allow for faster and more accurate discovery of outlying data and the problems such outlying data may represent, as manual selection of outlier discovery systems may be slow, and using an inappropriate outlier discovery system to attempt to detect outlying data may result in both false positives and false negatives.

A set of time series data may include a number of time series data objects, which may be of any suitable data object type, and may include, for example, timestamp data, a value, and metric data. The timestamp data may indicate the time at which the event described in the time series data object occurred. Events may include, for example, an action taken by a computer system, such as the sending of emails, a recurring measurement of an aspect of a computer system, including hardware or software, such as a hard drive temperature, or any other event which may be tracked, such as the sale of goods. The value may be any suitable value, such as a number, representing any suitable measure of the event, such as, for example, a number of emails sent out by a server, a temperature of a hard drive, or a number of items sold at a point-of-sale. The metric data may include any number of key-value pairs which may include any suitable data about the event. For example, key-value pairs may describe characteristics of a computing device or hardware component which the value measures.

A set of time series data may also include configuration or telemetry data. The configuration or telemetry data may be non-temporal data that may be related to the data in time series data objects of the set of time series data. For example, the configuration or telemetry data may describe the configuration of a hardware component of a computing device, such as a hard drive, whose measurements, such as temperatures, are stored in the time series data objects.

Sets of time series data may be received from any suitable source, such as, for example, any suitable time series database. For example, sets of time series data may be taken from the logs of a computing device, and may include measurements of any suitable aspects of the hardware, including, for example, hard drives and other non-volatile storage devices, volatile storages devices such as RAM, CPUs, GPUs, and other processors, and power supplies, and software of the computing device over time. Sets of time series data may include data taken across multiple computing devices, such as, for example, a server system that includes multiple drives and processors, and data taken from other hardware, such as from network hubs, routers, and switches. Sets of time series day may also be taken from, for example, a sales database, and may include measurements of the sales of any particular goods or services over time. The sets of time series data may be used to generate the training data set for the neural network.

The sets of time series data may each be pre-processed before being input to a statistical classifier. Metadata from a set of time series data may be extracted and stored in a database. The metadata may, for example, describe the source of the set of time series data and provide other identifying information for the set of time series data. Configuration or telemetry data may be extracted from the set of time series data, sampled, and pre-processed for input into a statistical classifier, for example, through generating a vector representation of the sampled configuration or telemetry data. The pre-processed configuration or telemetry data and the metadata may be stored in a database as part of the training data set The time series data objects from the set of time series data may be sampled in any suitable manner to generate a sampled set of time series data objects. Econometric and time series analysis (EST), or other suitable statistical decomposition techniques, may be applied to the sampled set of time series data objects to decompose them into sub-components. The sub-components of the sampled set of time series data objects may be stored in the database as part of the training data set along with the metadata and preprocessed configuration or telemetry data for the set of time series data. The sub-components may be represented in any suitable manner for input into a statistical classifier. For example, the sub-components may be represented using vector representations.

The sub-components of the sampled set of time series data objects and pre-processed configuration or telemetry data for a set of time series data may be input into a statistical classifier. The statistical classifier may be implemented in any suitable manner on any suitable computing device. For example, the statistical classifier may be a linear classifier, quadratic classifier, or decision tree classifier. The statistical classifier may be designed, or trained, in any suitable manner to select an outlier discovery system for a set of time series data based on input sub-components of a sampled set of time series data objects from the set of time series data and pre-processed configuration or telemetry data for the set of time series data. For example, a set of training data for the statistical classifier may be prepared using human selection of outlier discovery systems for a sets of time series data and used to train the statistical classifier, or the statistical classifier may be directly given rules, for example, in the form of a decision tree, for selecting outlier discovery systems for sets of time series data.

The statistical classifier may output a selection of an outlier discovery system to be used on the set of time series data from which the pre-processed configuration or telemetry data and the sub-components of the sampled set of time series data base objects were extracted. The selection may be based on the input sub-components of the sampled set of time series data objects and pre-processed configuration or telemetry data for the set of time series data. The statistical classifier may be able to select from among any suitable number of outlier discovery systems, for example, based on the number of outlier discovery systems the statistical classifier was trained, or given rules, to distinguish among. Outlier discovery systems that may be selected by the statistical classifier may include, for example, support vector machines (SVM), long short-term memory recurrent neural networks (LSTM RNN), and K-Means clustering.

The outlier discovery system selection made by the statistical classifier may be evaluated, for example, by a human reviewer. For example, a human reviewer may review all, or a sampling of, the outlier discovery system selections made by the statistical classifier, and may correct any apparent mistakes made by the statistical classifier in its selections. For example, K-Means clustering may be appropriate for detecting outlying data in a set of time series data whose measurements are normally clustered, while an LSTM RNN may be appropriate for detecting outlying data in a set of time series data whose measurements are variable. If the statistical classifier selects K-Means clustering as the outlier discovery system for input representing a set of time series data whose measurements are variable, the human reviewer may correct the selection to LSTM RNN. After review, or after being output by the statistical classifier if there is no review, the selection of an outlier discovery system, either as output by the statistical classifier or as modified by a reviewer, may be stored in the database as part of the training data set with the metadata, pre-processed configuration or telemetry data, and sub-components of the sampled set of time series data objects, for the set of time series data. The selected outlier discovery system may serve as the label, or classification, for the set of time series data in the training data set.

The training data set may include metadata, pre-processed configuration or telemetry data, sub-components of a sampled set of time series data objects, and a selected outlier discovery system, for any suitable number of sets of time series data. Metadata, pre-processed configuration or telemetry data, and sub-components of a sampled set of time series data objects, may represent the set of time series data from which they were extracted in the training date set. The metadata, pre-processed configuration or telemetry data, sub-components of a sampled set of time series data objects, and selected outlier discovery system for a set of time series data may be a group in the training data set. The training date set may include a group for each set of time series data for which an outlier discovery system is selected by the statistical classifier. Using a statistical classifier to generate the training data sets in conjunction with human review may allow for more efficient generation of larger training data sets than manual selection of outlier discovery systems for sets of time series data.

The neural network may be trained using the training data set. The neural network may be implemented in any suitable manner and on any suitable computing device, including, for example, the same computing device as the statistical classifier. The neural network may be implemented, for example, as a convolutional neural network, a recurrent neural network, a long short-term memory recurrent neural network, a hierarchical temporal memory neural network, or a single class support vector machine, using any form of supervised learning, such as, for example, backpropagation.

Pre-processed configuration or telemetry data and sub-components of a sampled set of time series data objects stored as part of the training data set in the database, for example, as vector representations, may be received and input to an input layer of the neural network. An output layer of the neural network may indicate a selection of an outlier discovery system for the set of time series data represented by the pre-processed configuration or telemetry data and sub-components of the sampled set of time series data objects. The selection of outlier discovery system indicated by the output layer of the neural network may be from among the same group of outlier discovery systems the statistical classifier selected from when generating the training data set. The output of the neural network may be binary or probabilistic. For example, the output of the neural network may be binary for each available outlier discovery system, with one of the available outlier discovery systems being indicated as selected and all others being indicated as not selected, for example, through a yes/no output for each available outlier discovery system, or through a single output which corresponds to the selected outlier discovery system. The output of the neural network may be probabilistic, or a confidence level, with the neural network assigning to each of the available outlier discovery systems a probability between 0% and 100%, indicating a level of confidence that the outlier discovery system is the correct one to use to detect outlying data in the set of time series data represented by the input to the neural network.

The selection of an outlier discovery system indicated by the output layer of the neural network for the set of time series data represented by the input to the neural network may be compared to the outlier discovery system selected for that set of time series data as indicated in the training data set. The outlier discovery system indicated in the training data set may be the output of the statistical classifier, or may have been modified based on human review. A level of error of the neural network may be determined based on any difference between the outlier discovery system selected by the neural network and the selected outlier discovery system indicated in the training data. If the output of the neural network is binary for each outlier discovery system, the level of error may be based on whether the neural network selected the same outlier discovery system as the one indicated in the training data set. If the output of the neural network is probabilistic, the level of error may be based on the level of confidence the neural network output for the outlier discovery system that is the one indicated in the training data set. The level of error may be used to train the neural network. For example, the level of error may be used with backpropagation to determine adjustments to weights between the various layers of the neural network. The adjustments may be applied to the weights of the neural network.

Pre-processed configuration or telemetry data and sub-components of a sampled set of time series data objects from groups in the training data set representing any number of sets of time series data may be input to the neural network to train the neural network. The level of error for the outlier discovery system selected by the neural network based on each input of pre-processed configuration or telemetry data and sub-components of a sampled set of time series data objects may be assessed and used to train the neural network. Any suitable number of sets of pre-processed configuration or telemetry data and sub-components of a sampled set of time series data objects from groups in the training data set may be used as inputs to the neural network to train the neural network, and the same inputs may be used any suitable number of times. For example, the neural network may be trained until it achieves a target level of error across a number of inputs of pre-processed configuration or telemetry data and sub-components of a sampled set of time series data objects from the training data set, or until the neural network accurately selects an outlier discovery system for a threshold percentage of inputs of pre-processed configuration or telemetry data and sub-components of a sampled set of time series data objects from the training data set. The groups which have pre-processed configuration or telemetry data and sub-components of a sampled set of time series data objects used as inputs to the neural network during training may be selected from the training data set in any suitable manner, such as, for example, randomly.

Any suitable number of groups in the training data set may be hidden. The hidden groups may be selected in any suitable manner, for example, randomly, and may be any suitable percentage of the total number of groups in the training data set. For example, 20% to 30% of the groups in the training data set may be randomly selected as hidden groups. Hidden groups may be used to evaluate the performance, accuracy, and level of error of the neural network after the neural network has been trained, for example, to determine if the neural network achieves a target level of error across a number of inputs of pre-processed configuration or telemetry data and sub-components of a sampled set of time series data objects from the training data set, or until the neural network accurately selects an outlier discovery system for a threshold percentage of inputs of pre-processed configuration or telemetry data and sub-components of a sampled set of time series data objects from the training data set. The level of error of the neural network on inputs from any of the hidden groups of the training data set may not be used to adjust the weights of the neural network.

After the neural network has been trained, the neural network may be used to select outlier discovery systems for novel sets of time series data. The novel sets of time series data may be received from any suitable source, such as, for example, logs from a computing device. A novel set of time series data may be pre-processed in the same manner as the sets of time series data used to generate the training data set. For example, metadata may be extracted from a received novel set of time series data. The configuration or telemetry data from the novel set of time series data may be sampled and then pre-processed, for example, through the generation of a vector representation. The time series data objects in the novel set of time series data may be sampled in any suitable manner to generate a sampled set of time series data objects, for example. The sampled set of time series data objects may be decomposed into sub-components, for example, using EST.

The pre-processed configuration or telemetry data and the sub-components of the samples set of time series data objects for the novel set of time series data may be input to the neural network, for example, at the input layer of the neural network. The output layer of the neural network may indicate a selection of an outlier discovery system for the novel set of time series data represented by the pre-processed configuration or telemetry data and sub-components of the sampled sets of time series data objects from among the same group of outlier discovery systems the statistical classifier selected from. The selection of the outlier discovery system by the neural network, for example, based on a binary output or a probabilistic output indicating a confidence level, may be output in any suitable manner. For example, the selection of the outlier discovery system may be output to an application so that it can be viewed by a user on the display of a computing device. The user may be able to provide feedback on the selected outlier discovery system, for example, indicating to the application if the selected outlier discovery system is obviously incorrect, which may result in further training of the neural network. The selection of the outlier discovery system may be output to an application or service running on the same computing device on which the neural network is implemented or on a different computing device. The service or application may access the novel set of time series data, for example, from the same location the novel set of time series data was received from by the neural network, or from the database, and may implement the selected outlier discovery system and apply it to the set of time series data to detect outlying data. The detection of any outlying data may then be handled in an appropriate manner. For example, outlying data detected in a set of time series data representing the temperatures of hard drives in a server system may result in corrective action being taken, for example, backing up of data and replacement of hard drives. Outlying data in a set of time series data may also indicate, for example, the misconfiguration of devices, software, or operating systems, which may need to be corrected.

New outlier discovery systems may be added to the outlier discovery systems from among which the neural network may select. For example, the statistical classifier may be retrained or redesigned to add a new outlier discovery system, and then may be used to generate a new training data set which includes representations of sets of time series data for which the new outlier discovery system was selected. The new training data set may be use to further train the neural network, so that the neural network may be able to select the new outlier discovery system. The output layer of the neural network may need to be modified structurally to accommodate the ability to select the new outlier discovery network, depending on the manner in which the output layer represents the selection of outlier discovery systems by the neural network.

FIG. 1 shows an example system for outlier discovery system selection according to an implementation of the disclosed subject matter. A computing device 100 may be any suitable computing device, such as, for example, a computer 20 as described in FIG. 8, or component thereof, for outlier discovery system selection. The computing device 100 may include a data pre-processor 110, a statistical classifier 120, a neural network 130, and a neural network trainer 135. The computing device 100 may be a single computing device, or may include multiple connected computing devices, and may be, for example, a laptop, a desktop, an individual server, a server cluster, a server farm, or a distributed server system, or may be a virtual computing device or system, or any suitable combination of physical and virtual systems. For simplicity, generic components such as the processor, short and long term storage, the operating system, much of the database management system are not shown. The computing device 100 may be part of a computing system and network infrastructure, or may be otherwise connected to the computing system and network infrastructure, including a larger server network which may include other server systems similar to the computing device 100. The computing device 100 may include any suitable combination of central processing units (CPUs), graphical processing units (GPUs), and tensor processing units (TPUs), which may be used to implement the various components of an outlier discovery system.

The data pre-processor 110 may be a component of the computing device 100 that may include any suitable combination of hardware and software for pre-processing data, such as, for example, a set of time series data, and preparing the data to be input into the statistical classifier 120 and the neural network 130, and to be stored in a database 145 in the storage 140. The data pre-processor 110 may, for example, extract metadata from a set of time series data, sample configuration or telemetry data from the set of time series data and represent the sampled configuration or telemetry data in any suitable format, such as, for example, as a vector, and sample time series data objects from the set of time series data, decompose the sampled set of time series data objects in sub-components, and represent the sub-components of the sampled set of time series data objects in any suitable format, such as, for example, as a vector.

The statistical classifier 120 may be a component of the computing device 100 that may include any suitable combination of hardware and software for using statistical classification to select an outlier discovery system for a set of time series data. The statistical classifier 120 may be a linear classifier, quadratic classifier, or decision tree classifier. The statistical classifier 120 may be designed, or trained in any suitable manner, to select an outlier discovery system for a set of time series data based on input sub-components of a sampled set of time series data objects from the set of time series data and pre-processed configuration or telemetry data for the set of time series data. The statistical classifier 120 may be used to generate data, for example, groups representing sets of time series data including metadata, pre-processed configuration and telemetry data, sub-components of sampled time series data objects, and a selection of an outlier discovery system, that may be stored as part of a training data set 150 stored in the database 145.

The neural network 130 may be a component of the computing device 100 that may include any suitable combination of hardware and software for implementing a neural network that may be trained, and used, to select an outlier discovery system for a set of time series data. The neural network 130 may be implemented, for example, as a convolutional neural network, a recurrent neural network, a long short-term memory recurrent neural network, a hierarchical temporal memory neural network, or a single class support vector machine, using any form of supervised learning, such as, for example, backpropagation. The neural network 130 may be trained, for example, using the training data set 150, to select an outlier discovery system for a set of time series data based on input sub-components of a sampled set of time series data objects from the set of time series data and pre-processed configuration or telemetry data for the set of time series data.

The neural network trainer 135 may be a component of the computing device 100 that may include any suitable combination of hardware and software training the neural network 130. For example, the neural network trainer 135 may receive outlier discovery system selections made by the neural network 130 for sets of time series data and compare them to outlier discovery system selections for those sets of time series data made by the statistical classifier 120 and stored in the training data set 150. The neural network trainer 135 may determine levels of error in the outlier discovery system selections made by the neural network 130, and use the levels of error to determine and apply adjustments to weights of the neural network 130.

Figure 2A:
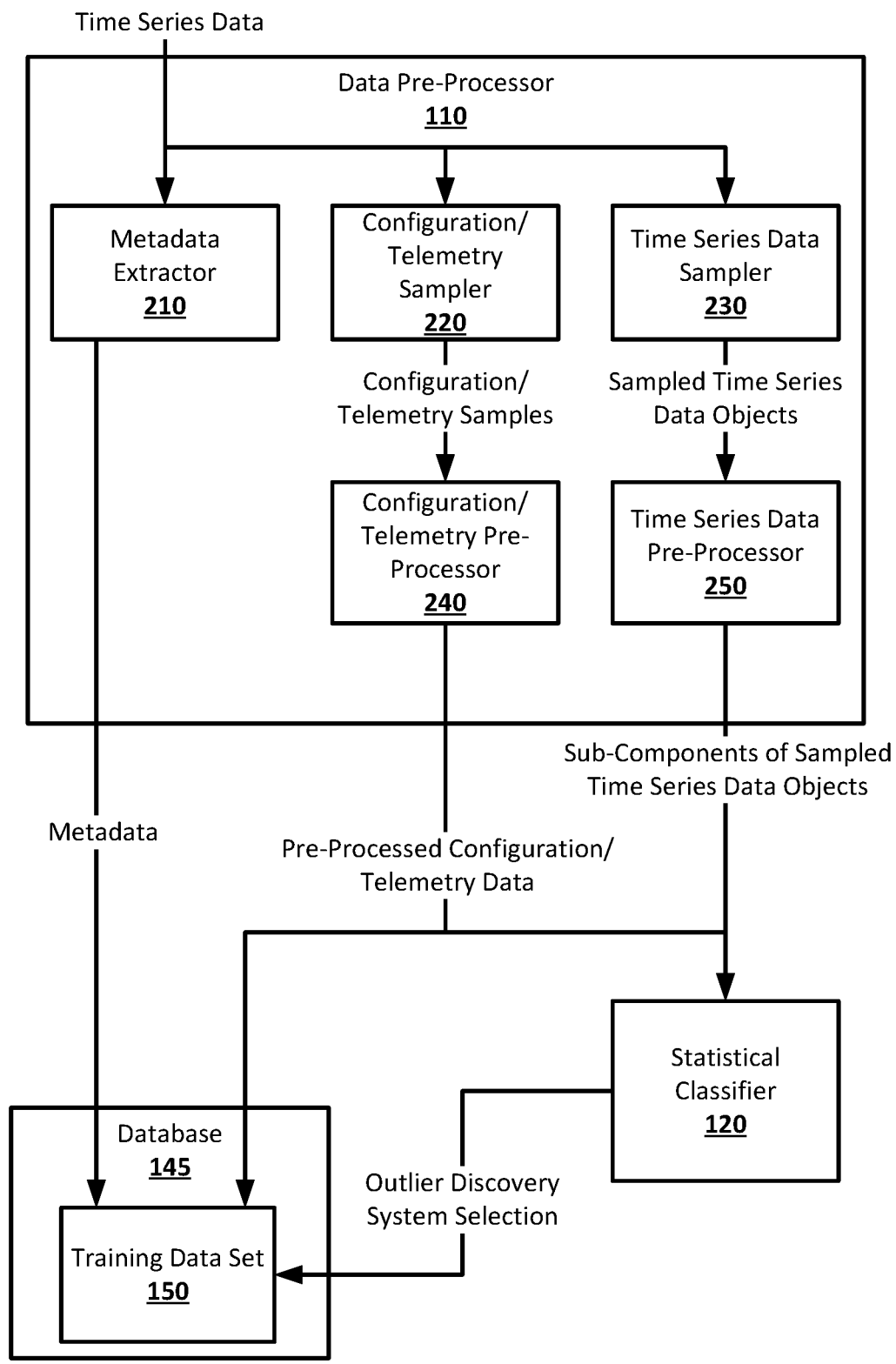
FIG. 2A shows an example system for outlier discovery system selection according to an implementation of the disclosed subject matter.

FIG. 2A shows an example system for outlier discovery system selection according to an implementation of the disclosed subject matter. The data pre-processor 110 may receive a set of time series data. The set of time series data may include any number of time series data objects, which may include any suitable measurements of any suitable events. The set of time series data may be received from any suitable source, such as, for example, from the logs of another computing device, such as a server system.

A metadata extractor 210 may be a component of the data pre-processor 110 that may include any suitable combination of hardware and software for extracting metadata from the set of time series data received by the data pre-processor 110. The metadata may, for example, describe the source of the set of time series data and provide other identifying information for the set of time series data. The extracted metadata may be stored as part of the training data set 150 in the database 145.

A configuration/telemetry sampler 220 may be a component of the data pre-processor 110 that may include any suitable combination of hardware and software for sampling configuration or telemetry data from the set of time series data received by the data pre-processor 110. The configuration or telemetry data may be non-temporal data that may be related to the data in time series data objects of the set of time series data. The samples of the configuration or telemetry data taken by the configuration/telemetry sampler 220 may be sent to be pre-processed by a configuration/telemetry processor 240.

The configuration/telemetry pre-processor 240 may be a component of the data pre-processor 110 that may include any suitable combination of hardware and software for pre-processing samples of configuration or telemetry data received from the configuration/telemetry sampler 220. The configuration/telemetry pre-processor 240 may pre-process the samples of configuration or telemetry data for input into a statistical classifier, for example, through generating a vector representation of the samples of configuration or telemetry data. The pre-processed configuration or telemetry data may be stored as part of the training data set 150 in the database 145 along with the metadata extracted from the set of time series data, and may be used as input into the statistical classifier 120.

A time series data sampler 230 may be a component of the data pre-processor 110 that may include any suitable combination of hardware and software for sampling time series data objects from the set of time series data received by the data pre-processor 110. The time series data objects may be sampled in any suitable manner, such as, for example, random sampling, and the set of sampled time series data objects may be of any suitable size. The set of sampled time series data objects generated by the time series data sampler 230 may be sent to be pre-processed by a time series data pre-processor 250.

The time series data pre-processor 250 may be a component of the data pre-processor 110 that may include any suitable combination of hardware and software for pre-processing a sampled set of time series data objects received from the time series data sample 230. The time series data pre-processor 250 may pre-process the set of sampled time series data objects for input into the statistical classifier 120, for example, through decomposition of the sampled set of time series data objects into sub-components though EST or other suitable statistical decomposition techniques. The sub-components of the sampled set of time series data objects may be generated as a vector representation. The sub-components of the sampled set of time series data objects may be stored as part of the training data set 150 in the database 145 along with the metadata extracted from the set of time series data and the pre-processed configuration or telemetry data for the set of time series data, and may be used as input into the statistical classifier 120.

The statistical classifier 120 may output a selection of an outlier discovery system to be used on the set of time series data which was received by the data pre-processor 110. The selection may be based on the input sub-components of the sampled set of time series data objects and pre-processed configuration or telemetry data for the set of time series data. The statistical classifier may be able to select from among any suitable number of outlier discovery systems, for example, based on the number of outlier discovery systems the statistical classifier 120 was trained, or given rules, to distinguish among. Outlier discovery systems that may be selected by the statistical classifier 120 may include, for example, SVM, LSTM RNN, and K-Means clustering. The outlier discovery system selection output by the statistical classifier 120 may be stored as part of the training data set 150 in the database 145 in a group with the metadata extracted from the set of time series data and the pre-processed configuration or telemetry data for the set of time series data. The group may be a representation in the training data set 150 of the set of time series data that was received by the data pre-processor 110.

The data pre-processor 110 may receive any suitable number of sets of time series data. For each received set of time series data, the data pre-processor 110 and the statistical classifier 120 may generate a group, including extracted metadata, pre-processed configuration or telemetry data, a sampled set of time series data objects, and an outlier discovery system selection, to represent that set of time series data in the training data set 150.

Figure 2B:
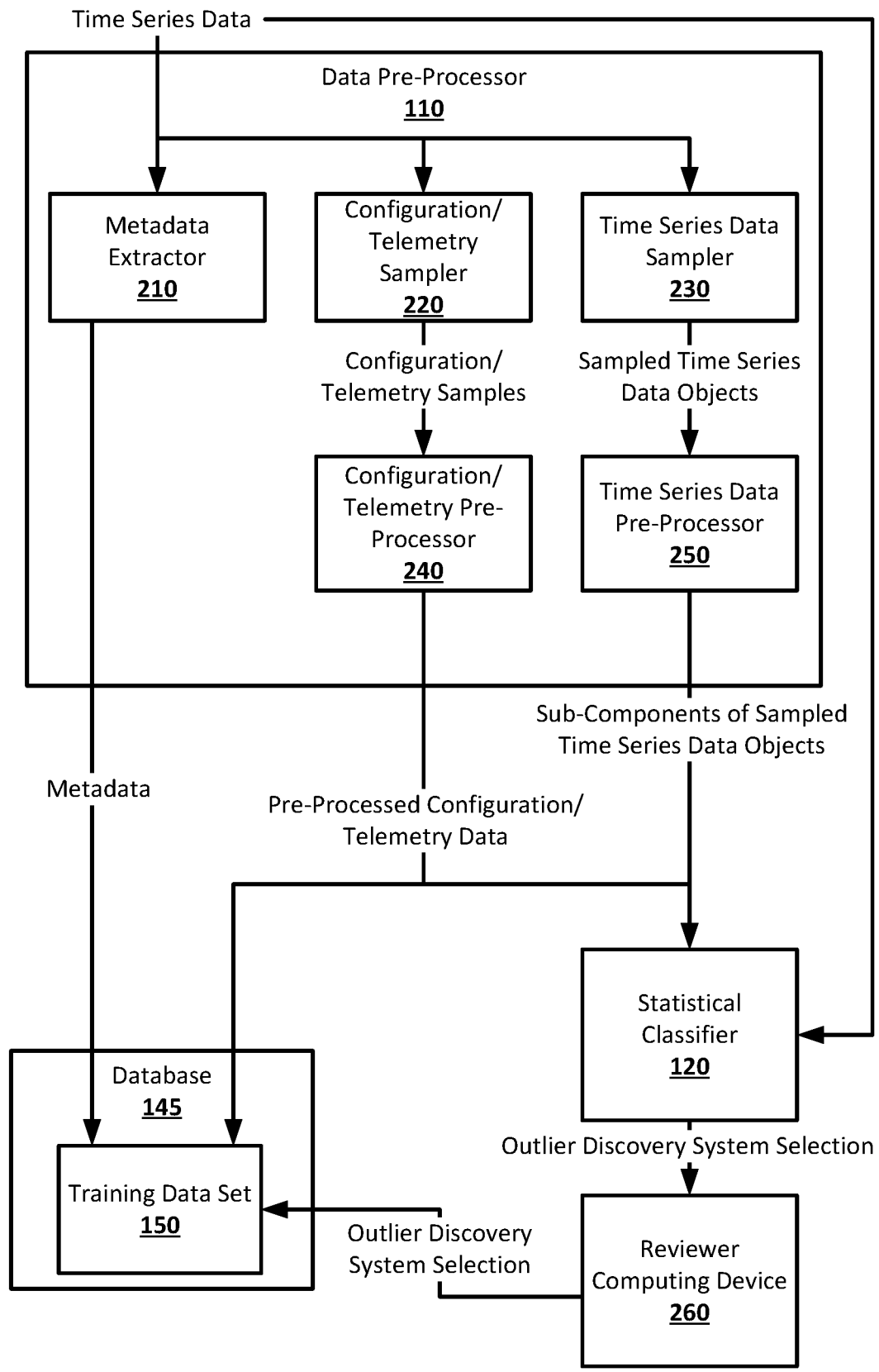
FIG. 2B shows an example system for outlier discovery system selection according to an implementation of the disclosed subject matter.

FIG. 2B shows an example system for outlier discovery system selection according to an implementation of the disclosed subject matter. Some outlier discovery system selections output by the statistical classifier 120 may be reviewed before being stored as part of the training data set 150 in the database 145. For example, a random sampling of outlier discovery system selections may be reviewed by a human reviewer.

A reviewer computing device 260 may be any suitable computing device, such as, for example, a laptop, desktop, tablet, smartphone, or other computing device, which may be used to review outlier discovery system selections made by the statistical classifier 120. An outlier discovery system selection output by the statistical classifier 120 may be received at the reviewer computing device 260 along with the set of time series data, or a sampled set of time series data objects or sub-components thereof, that outlier discovery system selection was made for. A reviewer may determine if the outlier discovery system selection output by the statistical classifier 120 is appropriate for the set of time series data. The reviewer may use any suitable data from the set of time series data. For example, the reviewer may use the metadata to determine the nature of the set of time series data, for example, what the measurements in the time series data objects measure, to assess the appropriateness of the selected outlier discovery system. The reviewer may use any suitable visualization tools to view the set of time series data, for example, to determine any clustering or variability present in the set of time series data. The reviewer computing device 260 may output an outlier discovery system selection to be stored as part of the training data set 150 in the database 145 in a group with the metadata extracted from the set of time series data and the pre-processed configuration or telemetry data for the set of time series data. The outlier discovery system selection output by the reviewer computing device 260 may be the same as the outlier discovery system selection output by the statistical classifier 120, or may be a different, for example, if the reviewer decided that there was a more appropriate outlier discovery system for finding outlying data in the set of time series data reviewed at the reviewer computing device 260.

Figure 3:
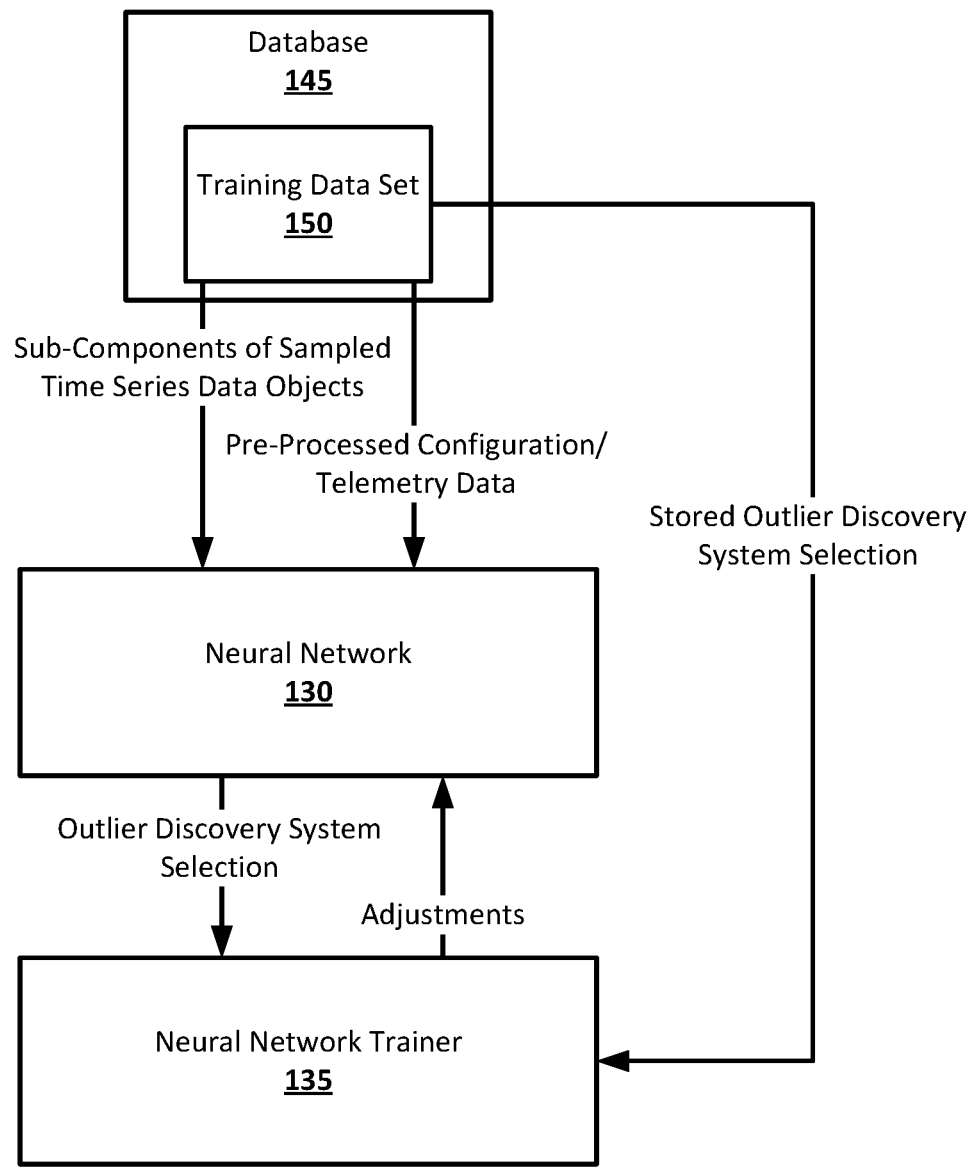
FIG. 3 shows an example system for outlier discovery system selection according to an implementation of the disclosed subject matter.

FIG. 3 shows an example system for outlier discovery system selection according to an implementation of the disclosed subject matter. The training data set 150 may be used to train the neural network 130. The neural network 130 may receive the sub-components of sampled time series data objects and pre-processed configuration or telemetry data from the training data set 150. The sub-components of sampled time series data objects and pre-processed configuration or telemetry data may be from a group representing a set of time series data. The neural network 130 may output an outlier discovery system selection to the neural network trainer 135.

The neural network trainer 135 may receive the outlier discovery system selection output by the neural network 130 and the outlier discovery system selection stored in the training data set 150 from the same group, and representing the same set of time series data, as the sub-components of sampled time series data objects and pre-processed configuration or telemetry data. The neural network trainer 135 may compare the outlier discovery system selection output by the neural network 130 and the stored outlier discovery system selection from the training data 150 to determine a level of error of the neural network 130. The level of error may be determined in any suitable manner, and may be based on the manner in which the neural network 130 outputs the outlier discovery system selection. For example, if the output of the neural network 130 is binary for each outlier discovery system that can be selected, the level of error may be based on whether the outlier discovery system selection output by the neural network 130 indicates the same outlier discovery system as the stored outlier discovery system selection from the training data set 150. If the output of the neural network 130 is probabilistic, the level of error may be based on the level of confidence the neural network 130 output for the outlier discovery system indicated by the stored outlier discovery system selection from the training data set 150.

The level of error may be used to train the neural network 130. For example, the neural network trainer 135 may use the level of error with backpropagation to determine adjustments to weights between the various layers of the neural network 130. The adjustments may be applied to the weights of the neural network 130. Any suitable number of set of sub-components of sampled time series data objects and pre-processed configuration or telemetry data from groups in the training data set 150 may be used as inputs to the neural network 130 to train the neural network 130, and the same inputs maybe used any number of times. For example, the neural network trainer 135 may stop the training of the neural network 130 when the neural network 130 has achieved a target level of error across a number of inputs from the training data set 150, or after the neural network 130 is able to correctly select an outlier discovery system for a target percentage of the set of time series data represented by groups in the training data set 150. The groups which have pre-processed configuration or telemetry data and sub-components of a sampled set of time series data objects used as inputs to the neural network during training may be selected from the training data set in any suitable manner, such as, for example, randomly.

Any suitable number of groups in the training data set 150 may be hidden. The hidden groups may be selected in any suitable manner, for example, randomly, and may be any suitable percentage of the total number of groups in the training data set. For example, 20% to 30% of the groups in the training data set 150 may be randomly selected as hidden groups. Hidden groups may be used to evaluate the performance, accuracy, and level of error of the neural network 130 after the neural network 130 has been trained, for example, to determine if the neural network 130 achieves a target level of error across a number of inputs of pre-processed configuration or telemetry data and sub-components of a sampled set of time series data objects from the training data set 150, or until the neural network 130 accurately selects an outlier discovery system for a threshold percentage of inputs of pre-processed configuration or telemetry data and sub-components of a sampled set of time series data objects from the training data set 150. The level of error of the neural network 130 on inputs from any of the hidden groups of the training data set 150 may not be used to adjust the weights of the neural network 130.

Figure 4A:
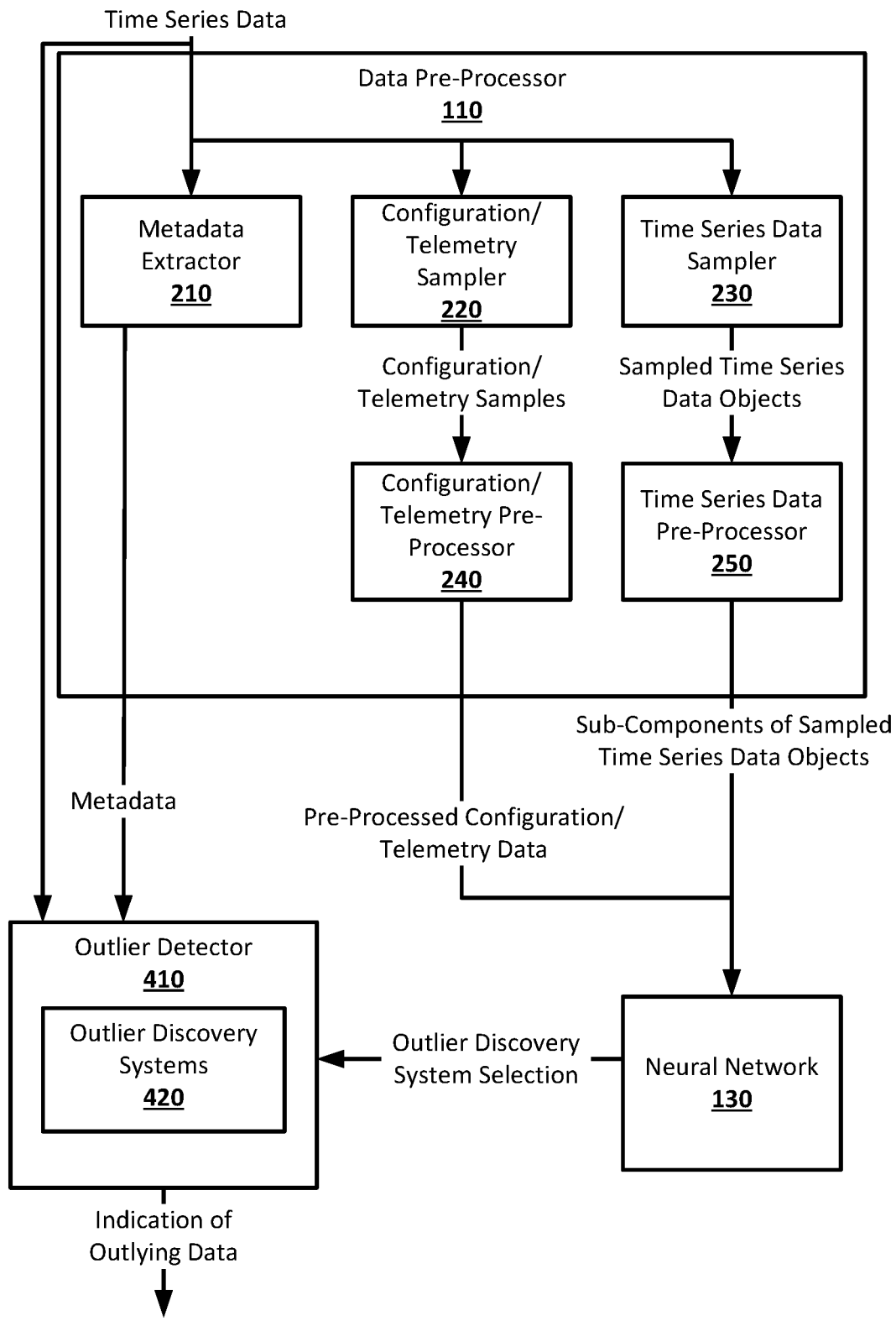
FIG. 4A shows an example system for outlier discovery system selection according to an implementation of the disclosed subject matter.

FIG. 4A shows an example system for outlier discovery system selection according to an implementation of the disclosed subject matter. The neural network 130 may be used to select outlier discovery systems for novel sets of time series data after being trained by the neural network trainer 135. The data pre-processor 110 may receive a set of time series data, which may be different from the sets of time series data received by the data pre-processor, processed for input into the statistical classifier 120, and represented in the training data set 150.

The metadata extractor 210 may extract metadata from the set of time series data received by the data pre-processor 110. The configuration/telemetry sampler 220 and the configuration/telemetry pre-processor 240 may sample and pre-process configuration or telemetry data from the set of time series data. The time series data sampler 230 and the time series data pre-processor 250 may sample time series data objects from the set of time series data and decompose the sampled time series data objects into sub-components. The sub-components of the sampled time series data objects and the pre-processed configuration or telemetry data may be received as input by the neural network 130, which may output an outlier discovery system selection.

The outlier discovery system selection output by the neural network 130 may be received at an outlier detector 410 along with the set of time series data. The outlier detector 410 may be any suitable combination of hardware and software which may implement outlier discovery systems 420. The outlier detector 410 may, for example, be part of the computing device 100, or may be implemented on a separate computing device. The outlier detector 410 may also receive the extracted metadata from the metadata extractor. The outlier discovery systems 420 may be implementations of the various outlier discovery systems from among which the neural network 130 selects. The outlier detector 410 may be able to use any of the outlier discovery systems 420 to determine if there is outlying data in a set of time series data.

The outlier detector 410 may use the outlier discovery system from the outlier discovery systems 420 that is indicated by the outlier discovery system selection to determine if the set of time series data includes outlying data. The outlier detector 410 may output an indication of outlying data, which may indicate what, if any, outlying data was found in the set of time series data using the selected outlier discovery system. The indication of outlying data may be used in any suitable manner. For example, the indication of outlying data may be sent to a human reviewer, who may take appropriate action to correct any problems indicated by any detecting outlying data at the source of the set of time series data, for example, repairing, reconfiguring, or replacing hardware or software in a computing device. The metadata may be used along with the indication of outlying data to provide additional context about the time series data to a human reviewer. The indication of outlying data may be sent to other computing devices or systems which may be able to take appropriate action without human intervention. The metadata, pre-processed configuration or telemetry data, sub-components of sampled time series data objects, outlier discovery system selection, and indication of outlying data may be stored, for example, in the database 150 or any other suitable storage, for future use or reference.

Figure 4B:
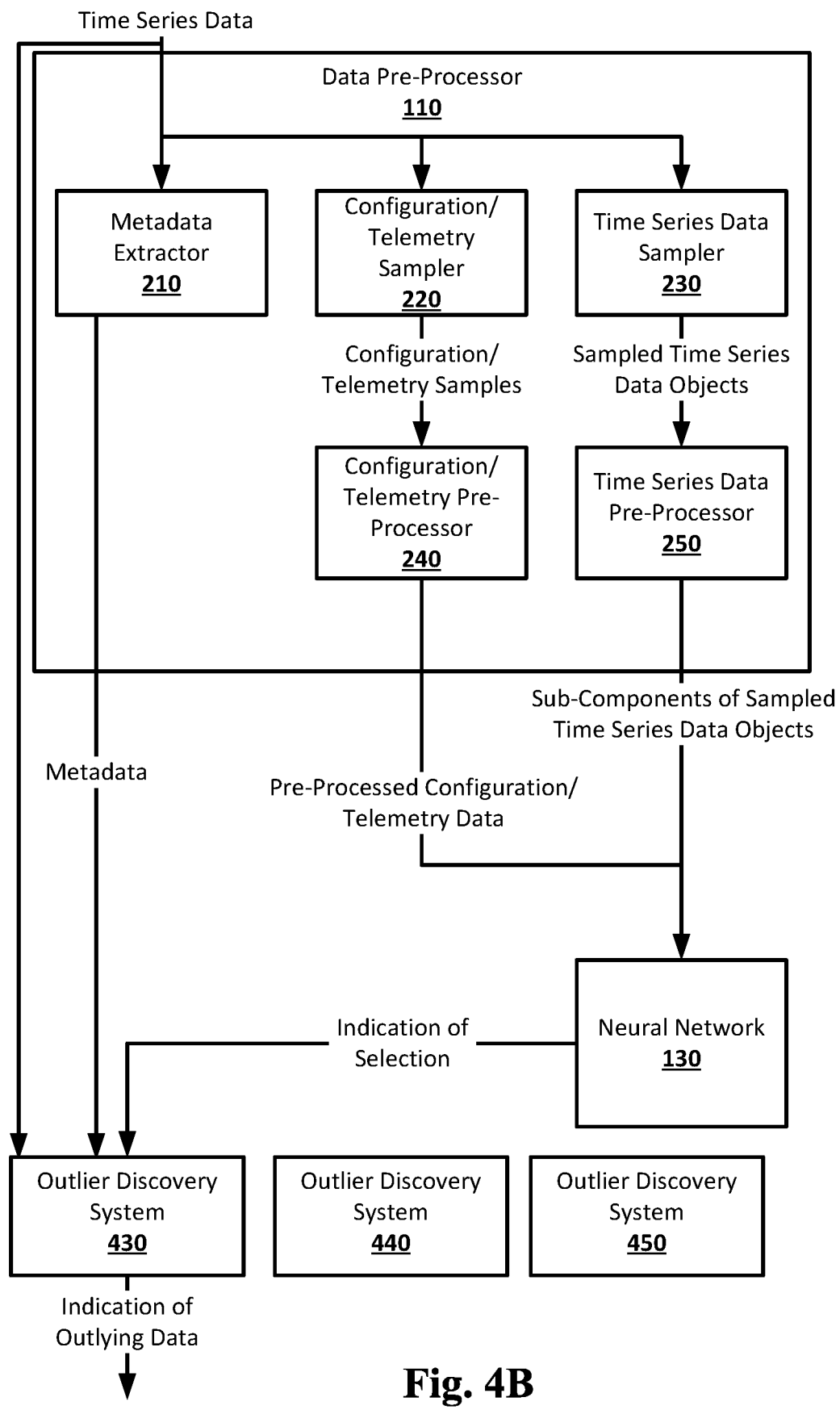
FIG. 4B shows an example system for outlier discovery system selection according to an implementation of the disclosed subject matter.

FIG. 4B shows an example system for outlier discovery system selection according to an implementation of the disclosed subject matter. The neural network 130 may indicate its selection of an outlier discovery system directly to the selected outlier discovery system. For example, the outlier discovery systems 430, 440, and 450, may be implemented on a computing device, such as the computing device 100. The neural network 130 may select the outlier discovery system 430, and may output an indication of this selection directly to the outlier discovery system 430. This may result in the activation of the outlier discovery system 430, which may receive the set of time series data and may output an indication of outlying data.

Figure 5:
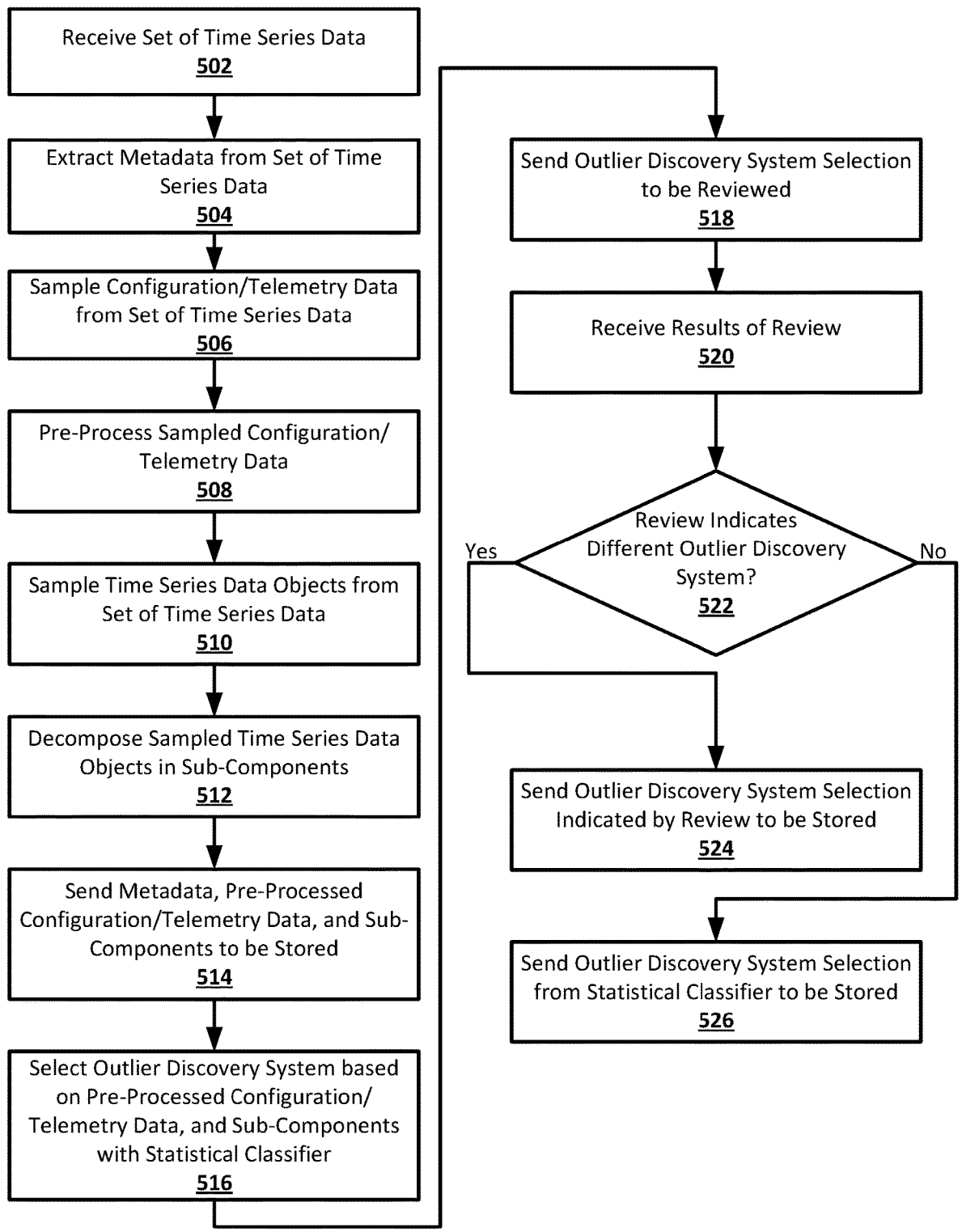
FIG. 5 shows an example procedure suitable for outlier discovery system selection according to an implementation of the disclosed subject matter.

FIG. 5 shows an example procedure suitable for outlier discovery system selection according to an implementation of the disclosed subject matter. At 502, a set of time series data may be received. For example, the data pre-processor 110 on the computing device 100 may receive a set of time series data.

At 504, metadata may be extracted from the set of time series data. For example, the metadata extractor 210 may extract metadata from the set of time series data received by the data pre-processor 110.

At 506, configuration or telemetry data from the set of time series data may be sampled. For example, the configuration/telemetry sampler 220 may sample configuration or telemetry data from the set of time series data received by the data pre-processor 110. The sampling may any suitable sampling, such as, for example, random sampling.

At 508, the sampled configuration or telemetry data from the set of time series data may be pre-processed. For example, the configuration/telemetry pre-processor 240 may pre-process the sampled configuration or telemetry data by generating a vector representation for the sampled configuration or telemetry data.

At 510, time series data objects from the set of time series data may be sampled. For example, the time series data sampler 230 may sample time series data objects from the set of time series data received by the data pre-processor 110. The sampling may be any suitable sampling, such as, for example, random sampling.

At 512, the sampled time series data objects may be decomposed into sub-components. For example, the time series data preprocessor 250 may decompose the sampled time series data objects into sub-components using EST. A vector representation may be generated from the sub-components of the sampled time series data objects.

At 514, the metadata, the pre-processed configuration or telemetry data, and the sub-components of the sampled time series data objects may be stored. For example, the metadata, the pre-processed configuration or telemetry data, and the sub-components of the sampled time series data objects may be stored as part of a group representing the set of time series data in the training data set 150 in the database 145.

At 516, an outlier discovery system may be selected by a statistical classifier based on the pre-processed configuration or telemetry data and the sub-components of the sampled time series data objects. For example, the statistical classifier 120 may receive the pre-processed configuration or telemetry data, and the sub-components of the sampled time series data objects, represented as, for example, vectors, as input. The statistical classifier 120 may output a selection of an outlier discovery system.

At 518, the outlier discovery system selection may be sent to be reviewed. For example, the outlier discovery system selection may be sent to the reviewer computing device 260. The reviewer computing device 260 may present the selected outlier discovery system, along with the set of time series data, to a human reviewer for evaluation.

At 520, the results of the review may be received. For example, the result of the review may be received at the computing device 100 from the reviewer computing device 260. The results may indicate whether the reviewer selected a different outlier discovery system than the outlier discovery system selected by the statistical classifier 120.

At 522, if the review indicates a different outlier discovery system than the outlier discovery system selected by the statistical classifier 120, flow proceeds to 524, otherwise flow proceeds to 526.

At 524, the outlier discovery system selection indicated by the review may be sent to be stored. For example, the outlier discovery system indicated by the review received from the reviewer computing device 260 may be different that the outlier discovery system selected by the statistical classifier 120, and may be stored with the metadata, the pre-processed configuration or telemetry data, and the sub-components of the sampled time series data objects as part of the training data set 150.

At 526, the outlier discovery system selection from the statistical classifier may be sent to be stored. For example, the review from the reviewer computing device 260 may not indicate a different outlier discovery system selection than the outlier discovery system selection from the statistical classifier 120, which may be stored with the metadata, the pre-processed configuration or telemetry data, and the sub-components of the sampled time series data objects as part of the training data set 150. In some implementations, only a portion of outlier discovery system selections made by the statistical classifier 120 may be sent to be reviewed at the reviewer computing device 260. Outlier discovery system selections which are not sent to be reviewed may be stored after being output by the statistical classifier 120.

Figure 6:
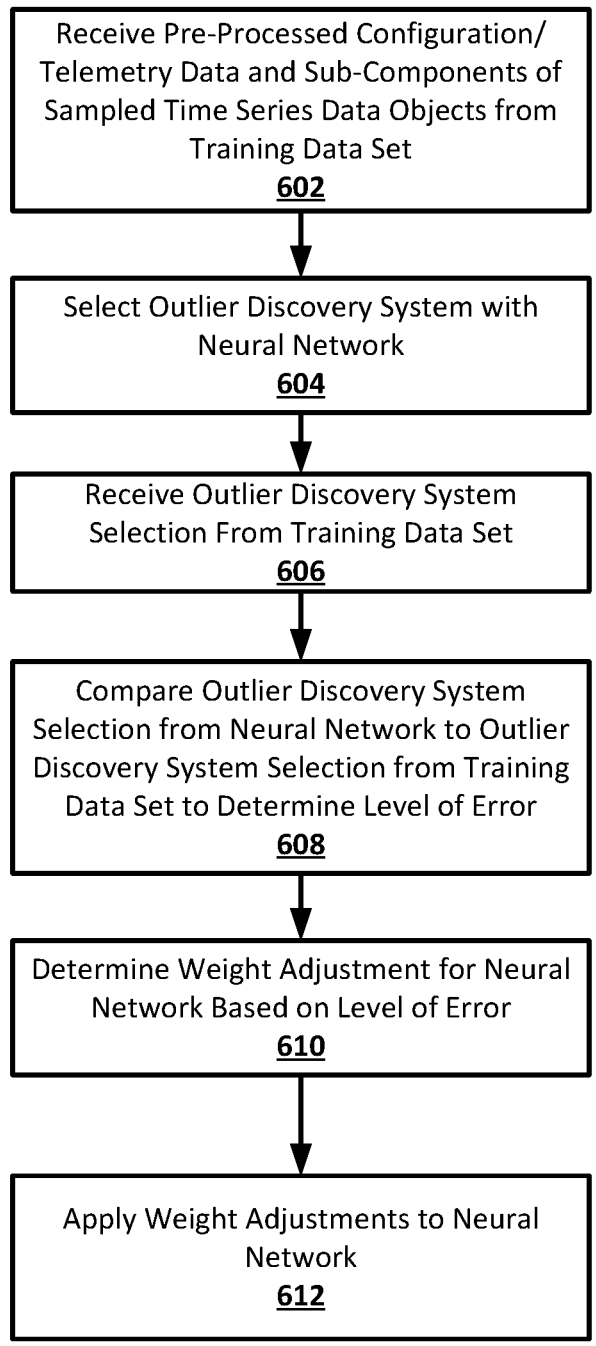
FIG. 6 shows an example procedure suitable for outlier discovery system selection according to an implementation of the disclosed subject matter.

FIG. 6 shows an example procedure suitable for outlier discovery system selection according to an implementation of the disclosed subject matter. At 602, pre-processed configuration or telemetry data and sub-components of sampled time series data objects from a training data set may be received. For example, the neural network 130 may receive, as input, pre-processed configuration or telemetry data and sub-components of sampled time series data objects that were stored in the training data set 150 as part of a group representing a set of time series data for which an outlier discovery system selection was output by the statistical classifier 120.

At 604, an outlier discovery system may be selected by a neural network. For example, the neural network 130 may receive the pre-processed configuration or telemetry data and the sub-components of the sampled time series data objects, represented as, for example, vectors, as input. The neural network 130 may output a selection of an outlier discovery system.

At 606, an outlier discovery system selection may be received from the training data set. For example, neural network trainer 135 may receive the stored outlier discovery system selection from the same group in the training data set 150 as the pre-processed configuration or telemetry data and sub-components of sampled time series data objects that were received by the neural network 130.

At 608, the outlier discovery system selection from the neural network may be compared to the outlier discovery system selection from the training data set to determine a level of error. For example, the neural network trainer 135 may receive the outlier discovery system selection output by the neural network 130 and compare it to the stored outlier discovery system selection from the training data set 150. The level of error may be based on whether the outlier discovery system selection output by the neural network 130 and the stored outlier discovery system selection from the training data set 150 indicate the same or different outlier discovery systems, and may also be based on a confidence level of the outlier discovery system selection output by the neural network 130.

At 610, weight adjustments may be determined for the neural network based on the level of error. For example, the neural network trainer 135 may use backpropagation, or any other suitable neural network training technique, to determine weight adjustments for the neural network 130 based on the level of error in the outlier discovery system selection output by the neural network 130.

At 612, weight adjustments may be applied to the neural network. For example, the neural network trainer 135 may adjust the weights of the neural network 130 based on the weight adjustments determined based on the level of error in the outlier discovery system selection output by the neural network 130.

Figure 7:
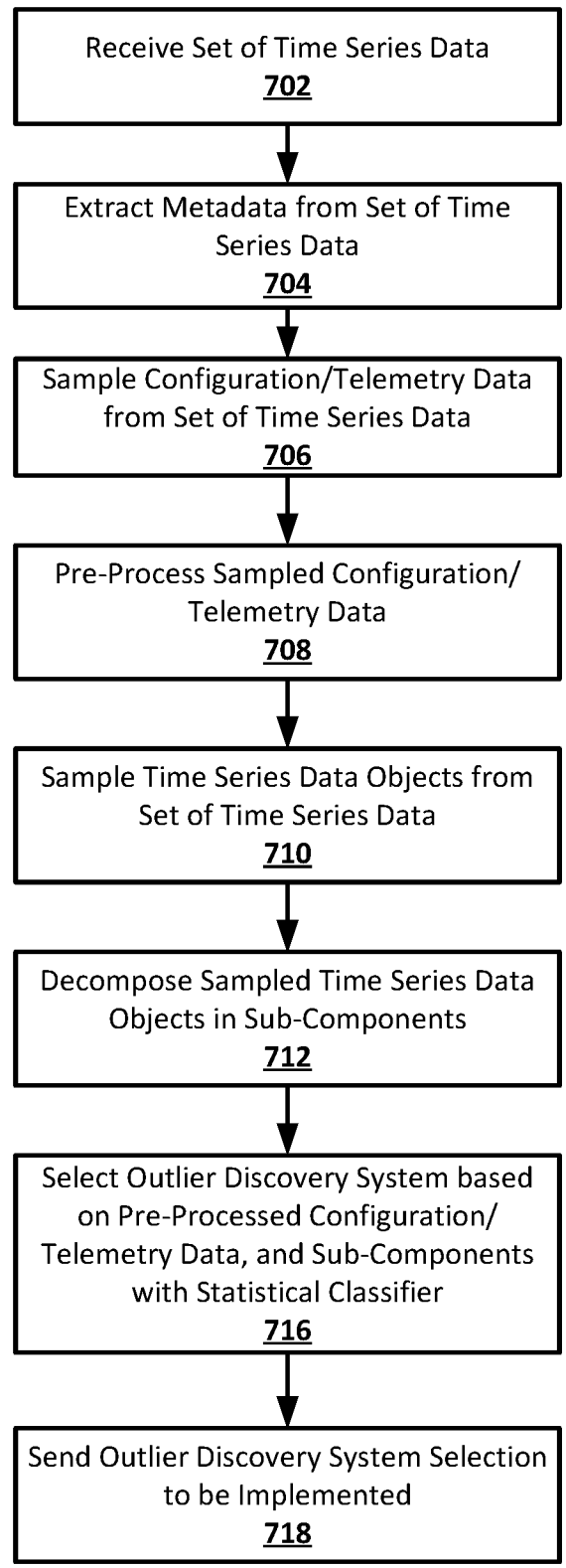
FIG. 7 shows an example procedure suitable for outlier discovery system selection according to an implementation of the disclosed subject matter.

FIG. 7 shows an example procedure suitable for outlier discovery system selection according to an implementation of the disclosed subject matter. At 702, a set of time series data may be received. For example, the data pre-processor 110 on the computing device 100 may receive a set of time series data. The set of time series data may be different from any set of time series data represented by a group in the training data set 150.

At 704, metadata may be extracted from the set of time series data. For example, the metadata extractor 210 may extract metadata from the set of time series data received by the data pre-processor 110.

At 706, configuration or telemetry data from the set of time series data may be sampled. For example, the configuration/telemetry sampler 220 may sample configuration or telemetry data from the set of time series data received by the data pre-processor 110. The sampling may any suitable sampling, such as, for example, random sampling.

At 708, the sampled configuration or telemetry data from the set of time series data may be pre-processed. For example, the configuration/telemetry pre-processor 240 may pre-process the sampled configuration or telemetry data by generating a vector representation for the sampled configuration or telemetry data.

At 710, time series data objects from the set of time series data may be sampled. For example, the time series data sampler 230 may sample time series data objects from the set of time series data received by the data pre-processor 110. The sampling may any suitable sampling, such as, for example, random sampling.

At 712, the sampled time series data objects may be decomposed into sub-components. For example, the time series data preprocessor 250 may decompose the sampled time series data objects into sub-components using EST. A vector representation may be generated from the sub-components of the sampled time series data objects.

At 714, an outlier discovery system may be selected by a neural network based on the pre-processed configuration or telemetry data and the sub-components of the sampled time series data objects. For example, the neural network 130 may receive the pre-processed configuration or telemetry data, and the sub-components of the sampled time series data objects, represented as, for example, vectors, as input. The neural network 130 may output a selection of an outlier discovery system.

At 716, the outlier discovery system selection may be sent to be implemented. For example, the outlier discovery system selection may be sent to the outlier detector 410 along with the set of time series data. The outlier detector 410 may use the appropriate one of the outlier discovery systems 420, based on the outlier discovery system indicated by the outlier discovery system selection, to determine if the set of time series data includes any outlying data. The outlier detector 410 may output an indication of an outlying data, which may be used in any suitable manner. For example, an indication of outlying data that indicates that the set of time series data included outlying data may result in action by a human or automated system, such as the repair, reconfiguration, or replacement of hardware or software which was measured to generate the set of time series data that included the outlying data. may present the selected outlier discovery system, along with the set of time series data, to a human reviewer for evaluation.

Figure 8:
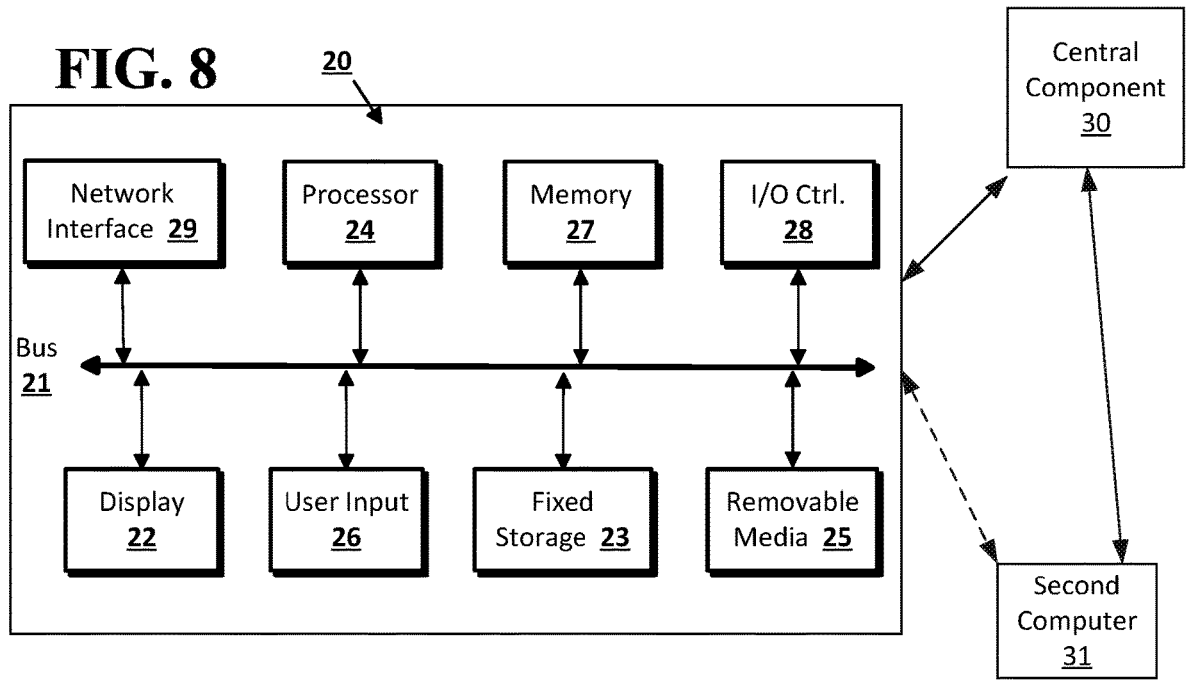
FIG. 8 shows a computer according to an implementation of the disclosed subject matter.

Implementations of the presently disclosed subject matter may be implemented in and used with a variety of component and network architectures. FIG. 8 is an example computer 20 suitable for implementing implementations of the presently disclosed subject matter. As discussed in further detail herein, the computer 20 may be a single computer in a network of multiple computers. As shown in FIG. 8, computer may communicate a central component 30 (e.g., server, cloud server, database, etc.). The central component 30 may communicate with one or more other computers such as the second computer 31. According to this implementation, the information obtained to and/or from a central component 30 may be isolated for each computer such that computer 20 may not share information with computer 31. Alternatively or in addition, computer 20 may communicate directly with the second computer 31.

The computer (e.g., user computer, enterprise computer, etc.) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 enable data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may enable the computer to communicate with other computers via one or more local, wide-area, or other networks, as shown in FIG. 9.

Many other devices or components (not shown) may be connected in a similar manner (e.g., document scanners, digital cameras and so on). Conversely, all of the components shown in FIG. 8 need not be present to practice the present disclosure. The components can be interconnected in different ways from that shown. The operation of a computer such as that shown in FIG. 8 is readily known in the art and is not discussed in detail in this application. Code to implement the present disclosure can be stored in computer-readable storage media such as one or more of the memory 27, fixed storage 23, removable media 25, or on a remote storage location.

Figure 9:
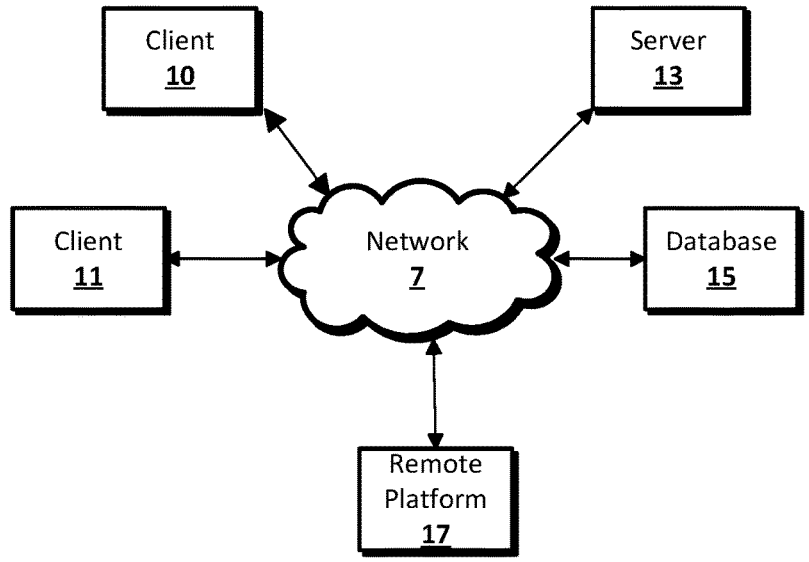
FIG. 9 shows a network configuration according to an implementation of the disclosed subject matter.

FIG. 9 shows an example network arrangement according to an implementation of the disclosed subject matter. One or more clients 10, 11, such as computers, microcomputers, local computers, smart phones, tablet computing devices, enterprise devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. Information from or about a first client may be isolated to that client such that, for example, information about client 10 may not be shared with client 11. Alternatively, information from or about a first client may be anonymized prior to being shared with another client. For example, any client identification information about client 10 may be removed from information provided to client 11 that pertains to client 10.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
receiving a set of time series data comprising time series data objects;
extracting a sample of time series data objects from the set of time series data;
decomposing the sample of time series data objects into sub-components; and
selecting, using a neural network, an outlier discovery system based on the sub-components decomposed from the sample of time series data objects.

2. The computer-implemented method of claim 1, further comprising:
applying the outlier discovery system selected by the neural network based on the sub-components decomposed from the sample of time series data objects to the set of time series data to determine whether one or more of the time series data objects in the set of time series data comprise outlying data.

3. The computer-implemented method of claim 2, further comprising:
determining at least one corrective action when the one or more of the time series data objects in the set of time series data are determined to comprise outlying data.

4. The computer-implemented method of claim 1, further comprising receiving input evaluating the outlier discovery system selected using the neural network.

5. The computer-implemented method of claim 1, wherein the time series data objects of the set of time series data comprise data associated with either hardware or software of one or more computing devices.

6. The computer-implemented method of claim 1, further comprising:
receiving a second set of time series data comprising time series data objects;
extracting a second sample of time series data objects from the second time series data;
decomposing the second sample of time series data objects into sub-components;
selecting, using statistical classification, an outlier discovery system based on the sub-components decomposed from the second sample of time series data objects;
selecting, using the neural network, an outlier discovery system based on the sub-components decomposed from the second sample of time series data objects;
determining a level of error of the neural network based on a comparison of the outlier discovery system selection made using statistical classification and the outlier discovery system selection made by the neural network; and
updating weights of the neural network based on the level of error of the neural network.

7. The computer-implemented method of claim 6, further comprising:
storing the sub-components and the outlier discovery system selection made using statistical classification in a database, and wherein the neural network receives the sub-components from the database.

8. The computer-implemented method of claim 6, further comprising receiving input evaluating the outlier discovery system selection made using statistical classification.

9. The computer-implemented method of claim 6, further comprising:
receiving configuration data associated with the set of time series data; and
extracting a sample of the configuration data, wherein the selecting, using statistical classification, an outlier discovery system based on the sub-components is also based on the sample of the configuration data.

10. A computer-implemented system for an outlier discovery system comprising:
one or more storage devices; and
a processor that receives a set of time series data comprising time series data objects, extracts a sample of time series data objects from the set of time series data, decomposes the sample of time series data objects into sub-components, selects, using a neural network, an outlier discovery system based on the sub-components decomposed from the sample of time series data objects.

11. The computer-implemented system of claim 10, wherein the processor further applies the outlier discovery system selected by the neural network based on the sub-components decomposed from the sample of time series data objects to the set of time series data to determine whether one or more of the time series data objects in the set of time series data comprise outlying data.

12. The computer-implemented system of claim 11, wherein the processor further determines at least one corrective action when the one or more of the time series data objects in the set of time series data are determined to comprise outlying data.

13. The computer-implemented system of claim 10, wherein the processor further receives input evaluating the outlier discovery system selected using the neural network.

14. The computer-implemented system of claim 10, wherein the time series data objects of the set of time series data comprise data associated with either hardware or software of one or more computing devices.

15. The computer-implemented system of claim 10, wherein the processor further receives a second set of time series data comprising time series data objects, extracts a second sample of time series data objects from the second time series data, decomposes the second sample of time series data objects into sub-components, selects, using statistical classification, an outlier discovery system based on the sub-components, selects, using the neural network, an outlier discovery system based on the sub-components decomposed from the second sample of time series data objects, determines a level of error of the neural network based on a comparison of the outlier discovery system selection made using statistical classification and the outlier discovery system selection made by the neural network, and update weights of the neural network based on the level of error of the neural network.

16. The computer-implemented system of claim 15, wherein the processor further stores the sub-components and the outlier discovery system selection made using statistical classification in a database stored on the one or more storage devices, and wherein the neural network receives the sub-components from the database.

17. The computer-implemented system of claim 15, wherein the processor further receives input evaluating the outlier discovery system selection made using statistical classification.

18. The computer-implemented system of claim 15, wherein the processor further receives configuration data associated with the set of time series data, and extracts a sample of the configuration data, wherein the selecting, using statistical classification, an outlier discovery system based on the sub-components is also based on the sample of the configuration data.

19. A system comprising: one or more computers and one or more storage devices storing instructions which are operable, when executed by the one or more computers, to cause the one or more computers to perform operations comprising:
receiving a set of time series data comprising time series data objects;
extracting a sample of time series data objects from the set of time series data;
decomposing the sample of time series data objects into sub-components; and
selecting, using a neural network, an outlier discovery system based on the sub-components decomposed from the sample of time series data objects.

20. The system of claim 19, wherein the instructions further cause the one or more computers to perform operations further comprising:
receiving a second set of time series data comprising time series data objects;
extracting a second sample of time series data objects from the second time series data;
decomposing the second sample of time series data objects into sub-components;
selecting, using statistical classification, an outlier discovery system based on the sub-components decomposed from the second sample of time series data objects;
selecting, using the neural network, an outlier discovery system based on the sub-components decomposed from the second sample of time series data objects;

determining a level of error of the neural network based on a comparison of the outlier discovery system selection made using statistical classification and the outlier discovery system selection made by the neural network; and updating weights of the neural network based on the level of error of the neural network.

\* \* \* \* \*